WELCH & AMMEDEN.
Tire Tightener.

No. 87,738.  
Patented March 9, 1869.

J. C. WELCH AND M. A. AMMEDEN, OF EDGERTON, OHIO.

Letters Patent No. 87,738, dated March 9, 1869; antedated March 5, 1869.

IMPROVEMENT IN WHEELS.

The Schedule referred to in these Letters Patent and making part of the same.

*To all whom it may concern:*

Be it known that we, J. C. WELCH and M. A. AMMEDEN, of Edgerton, in the county of Williams, and in the State of Ohio, have invented certain new and useful Improvements in Wheels for Vehicles; and do hereby declare that the following is a full, clear, and exact description thereof, reference being had to the accompanying drawings, and to the letters of reference marked thereon.

The nature of our invention consists in the construction and arrangement of a carriage-tire-joint for tightening the tire, which can be used on all wheels where a tire is used.

In order to enable others skilled in the art to make and use my invention, I will now proceed to describe its construction and operation, referring to the annexed drawings, which form a part of this specification, and in which—

A A represent the tires at the connection, with the pieces or blocks B B, through which the bolt C passes, made solid on the ends thereof.

Figure 1:
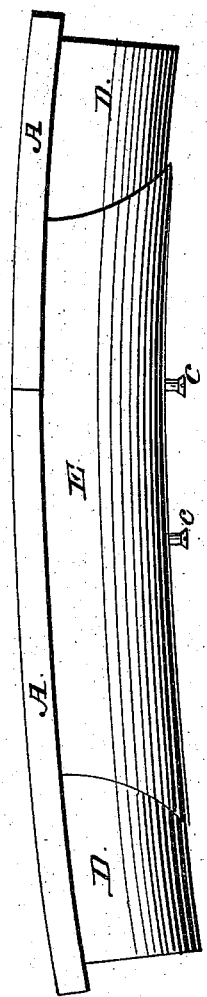
Figure 1 is a side view.
Figure 2:
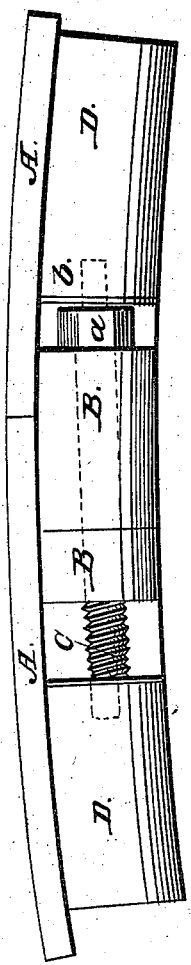
Figure 2 is also a side view with the cap removed.
Figure 3:
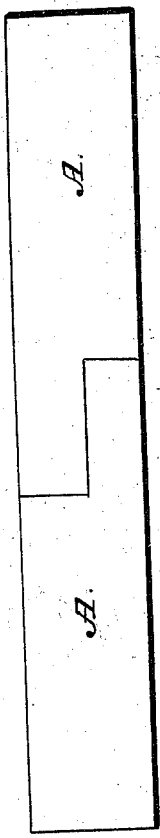
Figure 3 is a plan view.

The ends of the tires, with the blocks, are cut in such a manner that one-half of each forms a tongue, which projects into the other, as shown in fig. 3.

Both blocks B B are cut through, with a hole for the insertion of the bolt C, and the hole in one of these blocks is provided with screw-threads, to fit similar threads on the end of said bolt, so that by turning the bolt, by means of the nut $a$, cast or fastened on the other end of the same, the ends of the tire can be separated or tightened at pleasure, when necessary.

D D represent the ends of the felloes, which are provided with iron caps $b\ b$, of sufficient thickness to support the same.

E is a cap of suitable material, that covers all the joints or openings in the felloe, and is held in its place by two screws $c\ c$, which fasten into the tire-joint or blocks B B.

This cap is slotted where the screws pass through it, so that it can accommodate itself to the different positions of the joint, as the same is loosened or tightened.

Having thus fully described our invention,

What we claim as new, and desire to secure by Letters Patent, is—

The arrangement of the tire A, blocks B B, and screw C, in combination with the felloes D D, and cap E, all constructed as described, and operating as and for the purposes herein set forth.

In testimony that we claim the foregoing, we have hereunto set our hands and seals, this 18th day of May, 1868.

J. C. WELCH. [L. S.]
M. A. AMMEDEN. [L. S.]

Witnesses:
GEO. GARVER,
DANIEL SHINDLE.